Aug. 3, 1937.　　　W. J. MORRILL　　　2,089,066

VIBRATION ABSORBING MOUNTING

Filed Nov. 21, 1935

Inventor:
Wayne J. Morrill,
by Harry E. Dunham
His Attorney.

Patented Aug. 3, 1937

2,089,066

UNITED STATES PATENT OFFICE 2,089,066

VIBRATION ABSORBING MOUNTING

Wayne J. Morrill, Fort Wayne, Ind., assignor to General Electric Company, a corporation of New York Application November 21, 1935, Serial No. 50,909

5 Claims. (Cl. 248—26)

My invention relates to vibration absorbing mountings for dynamo-electric machines, or the like.

It is an object of my invention to provide a vibration absorbing mounting for a dynamo-electric machine, or the like, subjected to torsional oscillation or vibration during the normal operation thereof, which is rugged and compact in construction, which requires a minimum number of parts, and which is economical to manufacture.

Further objects and advantages of my invention will become apparent as the following description proceeds, and the features of novelty which characterize my invention will be pointed out with particularity in the claims annexed to and forming a part of this specification.

Figure 1:
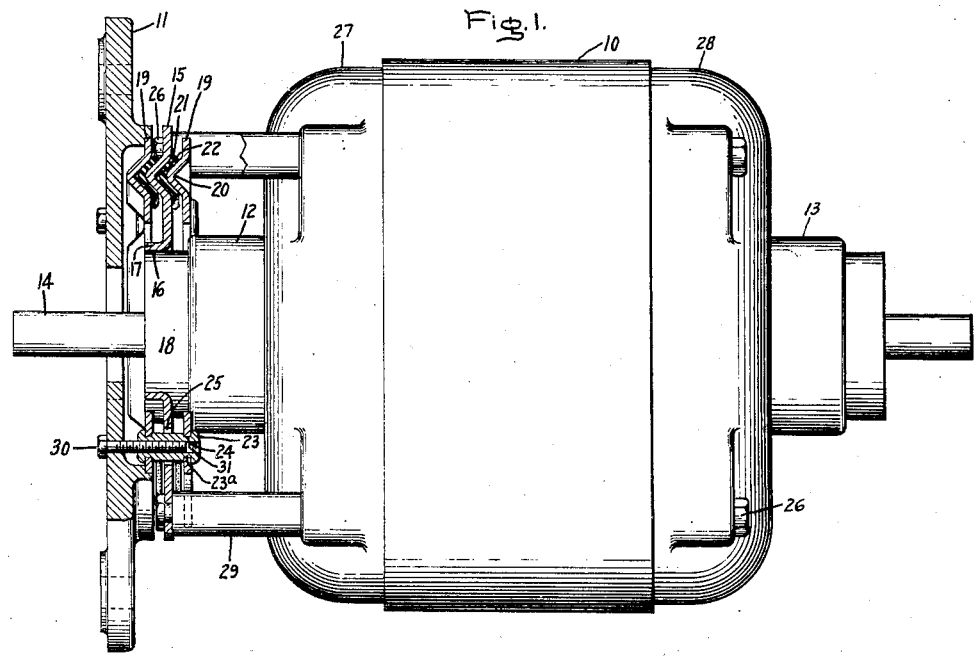
Figure 2:
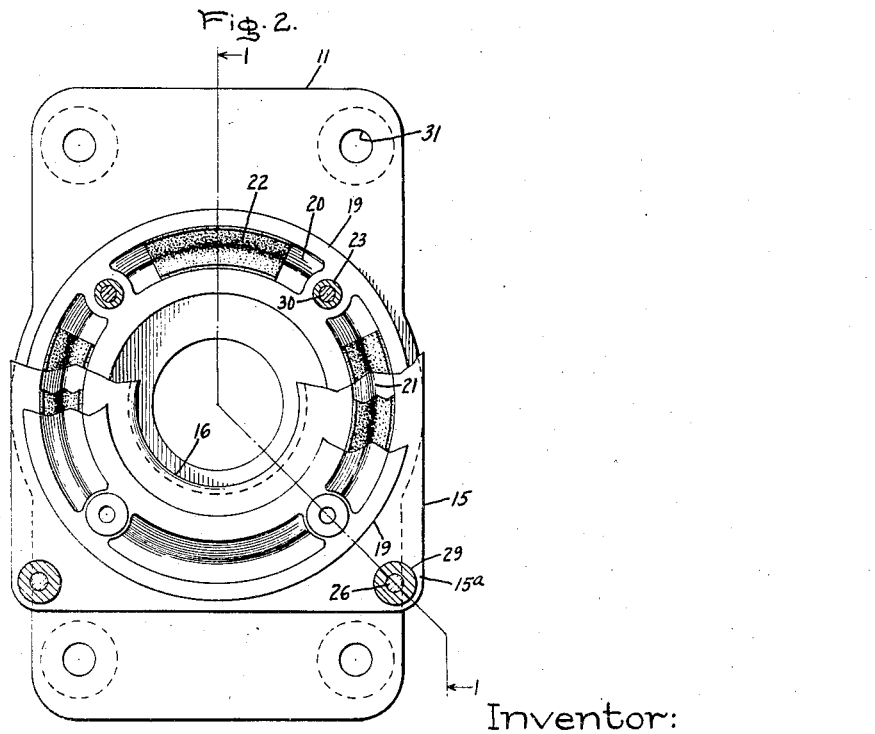

For a better understanding of my invention reference may be had to the accompanying drawing, in which Fig. 1 is a side elevation partly in section, along the line 1—1 in Fig. 2, of a dynamo-electric machine provided with a vibration absorbing mounting embodying my invention, and Fig. 2 is an end elevation of the base and vibration absorbing mounting shown in Fig. 1, part of the upper portion of the mounting being broken away in order to better illustrate the construction thereof.

Referring to the drawing, I have shown in Fig. 1 a dynamo-electric machine or motor 10, which is mounted on a suitable vertical base or support 11 by a vibration absorbing mounting embodying my invention. The motor 10 is provided with hubs 12 and 13 at the opposite ends thereof in which a rotatable driving shaft 14 is journaled, the motor rotor being carried by this shaft. The motor 10 is ordinarily subjected to torsional vibration during the normal operation thereof by periodic variations in load imposed on the motor. Furthermore, if the motor is of the alternating current type, it will be subjected to such torsional vibration by the periodically varying character of the alternating current supplied thereto. The driving shaft 14 is arranged with the longitudinal axis thereof substantially coincident with the axis of torsional oscillation of the motor 10.

The vibration absorbing mounting includes a rectangular supporting plate 15, which is provided with a circular aperture 16 therein surrounding and arranged on the hub 12 of the motor. The supporting plate 15 is provided with an outwardly projecting flange 17, which extends entirely about the aperture 16 and closely conforms to a reduced portion 18 on the outer end of the hub 12. The supporting plate 15 is arranged at substantially right angles with respect to the axis of the motor 10. A pair of duplicate circular sheet metal face plates 19 are arranged on opposite sides thereof of the supporting plate 15 and substantially parallel thereto. Each of the face plates 19 and the supporting plate 15 are provided with four complementary arcuate indentations forming a series of recesses 20 and 21, respectively, therein having a V-shaped cross section and arranged concentrically with respect to the motor shaft 14. Arcuate resilient members 22, preferably made of soft rubber or the like, are retained under compression between the adjacent faces of the supporting plate 15 and the face plates 19 in the indentations 20 and 21 formed therein. The face plates 19 are firmly secured against the adjacent resilient members 22 and prevented from moving relative to each other by a series of hollow bushings or attaching members 23, which clamp them together. The reduced portions 23a of the bushings 23 are mounted in registering holes 24 formed in the face plates 19 between the ends of the arcuate indentations or recesses 20 therein and the ends of the bushings 23 are peened over, so as to hold the face plates 19 rigidly in position. The bushings 23 pass through suitable apertures 25 formed in the supporting plate 15, the apertures 25 being of sufficient size to permit relative movement between the supporting plate 15 and the face plates 19.

The supporting plate 15 of the vibration absorbing mounting, described above, is preferably secured to the motor 10 by through-bolts 26, which also serve to hold the end shields 27 and 28 of the motor 10 in position. Spacing sleeves 29 surround the projecting ends of the through-bolts 26 and are secured between the supporting plate 15 and the adjacent end shield 27 of the motor 10. The bolts 26 are secured to the corner portions 15a of the supporting plate 15 beyond the edges of the face plates 19. The face plates 19 of the vibration absorbing mounting, described above, are secured to the mounting base 11 by a series of machine screws 30, which engage suitable threads 31 formed in the interior of the bushings 23. The face plates 19 are thus rigidly secured to the mounting base 11 and relative rotation therebetween is prevented. It will be understood that the arrangement might be reversed and the supporting plate 15 secured to the base 11 and the face plates 19 secured to the motor 10. The mounting base 11 is provided with a series of holes 31 adjacent the corners thereof in which suitable bolts may be placed to secure the motor in position on the machine with which it is to be used.

During operation of the motor 10, the mounting construction, described above, permits the motor 10 to oscillate, under the action of pulsating torque produced by the load, or pulsations in the torque of the motor, to a limited extent about an axis of torsional oscillation coincident with the axis of the driving shaft 14. Such oscillation or vibration of the motor is taken up and limited by the shear stress in the rubber members 22, the friction between the adjacent surfaces of the supporting plate 15 and the face plates 19 and the rubber members 22. In this manner, torsional vibration of the motor is absorbed by the mounting, and the torsional vibration of the motor is not, therefore, transmitted to the machine or structure on which the supporting plate 11 is mounted. Radial or axial vibration or movement of the motor 10 places the rubber members 22 under compression, so that the amplitude of radial or axial movement of the motor 10 is limited to a relatively small amount both by the resistance of the rubber to compression and by the indentations 20 and 21. As a result the motor 10 is mounted so as to be rigid against belt pull and axial displacement. It will thus be seen that the rubber members 22 are utilized to minimize vibratory movement of the motor 10 in all directions and, consequently, the amount of force transmitted to the base 11, due to vibratory movement of the motor 10, is also minimized. The arrangement of the complementary indentations or recesses 20 and 21 in the face plates 19 and supporting plate 15, described above, limits the radial displacement of the motor 10 and serves to hold the resilient members 22 firmly in position.

It will be seen that I have provided a vibration absorbing mounting which may be constructed from inexpensive sheet metal parts. Due to the compactness of the mounting, which I have provided, and also its relative arrangement with respect to the motor the overall length of the motor is not increased by the mounting and a consequent saving in space is effected. Moreover, it will be noted that my improved mounting may be applied to a standard motor without altering the construction thereof or providing special attachment projections on the motor frame.

Although I have shown a particular embodiment of my invention in connection with an electric motor, I do not desire my invention to be limited to the particular construction shown and described and I intend, in the appended claims, to cover all modifications within the spirit and scope of my invention.

What I claim as new and desire to secure by Letters Patent of the United States is:

1. A vibration absorbing mounting for securing to a support a dynamo-electric machine or the like subjected to torsional oscillation during the normal operation thereof comprising a supporting plate adapted to be arranged transversely of the axis of oscillatory movement of the machine, face plates arranged on opposite sides of said supporting plate, each of said plates having complementary arcuate recesses therein, said recesses having a substantially V-shaped cross-section, arcuate resilient members positioned in said recesses between the adjacent faces of said plates, means for retaining said resilient members under compression between said plates, and means for securing at least one of said plates to the machine and for securing at least one of the other of said plates to the support.

2. In combination a dynamo-electric machine or the like subjected to torsional oscillation during the normal operation thereof having hubs thereon and a shaft journaled in said hubs, said shaft being arranged with the axis thereof substantially coincident with the axis of oscillation of said machine, a vibration absorbing mounting for said machine comprising a supporting plate having an aperture therein extending about said shaft and arranged on one of said hubs, face plates arranged on opposite sides of said supporting plate and having apertures therein through which said shaft extends, at least one of said plates having indentations formed therein, resilient members positioned between the adjacent faces of said plates and in said indentations, means for retaining said resilient members under compression between said plates, means for securing said supporting plate to said machine, and means for securing said face plates to a support.

3. In combination a dynamo-electric machine or the like subjected to torsional oscillation during the normal operation thereof having hubs formed thereon and a driving shaft journaled in said hubs, a vibration absorbing mounting for said machine comprising a supporting plate having an aperture therein through which said shaft extends and arranged on one of said hubs, face plates arranged on opposite sides of said supporting plate and having apertures therein through which said last-mentioned hub extends, each of said plates having complementary arcuate indentations formed therein and arranged in substantially concentric relation with said shaft, said indentations having a substantially V-shaped cross-section, arcuate resilient members positioned in said indentations between the adjacent faces of said plates, means for retaining said resilient members in compression between said plates, means for securing said supporting plate to said machine, and means for securing said face plates to a support.

4. In combination a dynamo-electric machine or the like subjected to torsional oscillation during the normal operation thereof having hubs formed thereon and a driving shaft journaled in said hubs, a vibration absorbing mounting for said machine comprising a supporting plate having an aperture therein through which said shaft extends and arranged on one of said hubs, face plates arranged on opposite sides of said supporting plate and having apertures therein through which said one of said hubs extends, each of said plates having complementary arcuate indentations formed therein and arranged in substantially concentric relation with said shaft, said indentations having a substantially V-shaped cross-section, arcuate resilient members positioned in said indentations between the adjacent faces of said plates, said supporting plate having a series of apertures formed therein and arranged about said first-mentioned aperture therein, means including attaching members located in said last-mentioned apertures in said supporting plate for retaining said resilient members in compression between said plates and for preventing relative movement between said face plates, means for securing said supporting plate to said machine, and means for securing said face plates to a support.

5. In combination a dynamo-electric machine or the like subjected to torsional oscillation during the normal operation thereof having end shields at the opposite ends thereof, said end shields having hubs thereon, a driving shaft journaled in said hubs, bolts for securing said end shields to said machine, a vibration absorbing mounting for said machine comprising a supporting plate having an aperture therein through which said shaft extends and arranged on one of said hubs, face plates arranged on opposite sides of said supporting plate and having apertures therein through which said one of said hubs extends, each of said plates having complementary arcuate indentations formed therein and arranged in substantially concentric relation with said shaft, said indentations having a substantially V-shaped cross-section, arcuate resilient members positioned in said indentations between the adjacent faces of said plates, said supporting plate having a series of apertures formed therein and arranged about said first-mentioned aperture therein, means including attaching members located in said last-mentioned apertures in said supporting plate for retaining said resilient members in compression between said plates and for preventing relative movement between said face plates, means including extensions on said supporting plate and cooperating with said bolts for securing said supporting plate to said machine, and means for securing said face plates to a support.

WAYNE J. MORRILL.